2,830,368

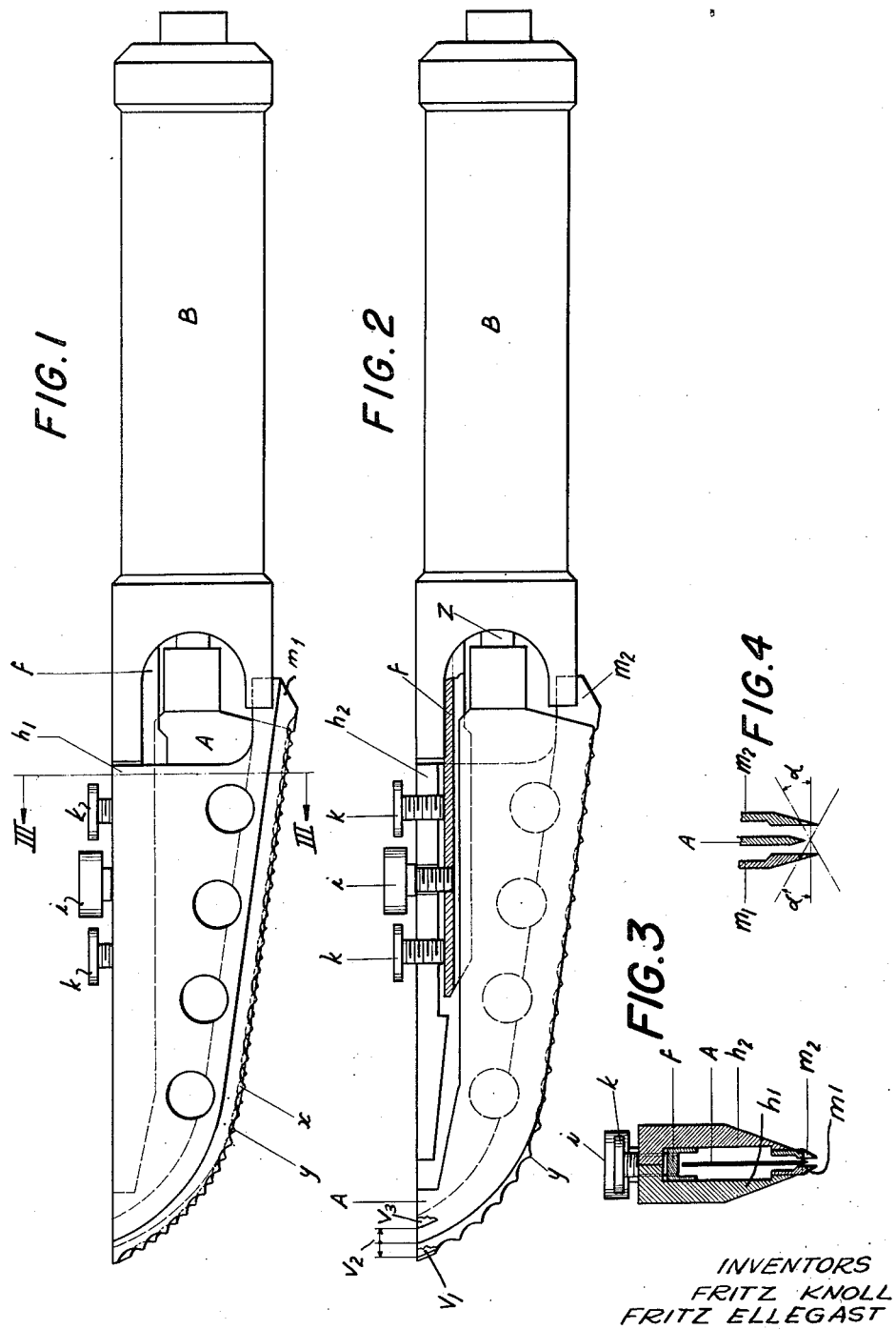

BUTCHERS' SKINNING KNIVES

Fritz Knoll, Konstanz, and Fritz Ellegast,
Uberlingen am Boden See, Germany

Application August 25, 1953, Serial No. 376,373

Claims priority, application Germany September 3, 1952

8 Claims. (Cl. 30—272)

This invention relates to a butcher's skinning knife of the kind comprising a reciprocating cutting blade, pointed at the front, a normal, in-line handle containing driving means for reciprocating the blade longitudinally of the handle, a carrier mounted on the handle and a channel-like frame member embracing the blade and guiding it in its reciprocating movement. Means are provided for detaching and adjusting the height of the blade in relation to the frame.

It has already been proposed so to construct the edges of the channel-like frame member that one edge extends below and the other above the cutting blade edge such that the three edges, frame edge, blade edge and frame edge, form an angle transversely to the plane of the blade. The angle is such that when the knife is presented to the carcass the angle may be the said three edges is a convenient one for skinning.

It is an object of the present invention to improve this construction of knife whereby improved effects are obtained and in particular to cause an undulation of the working surface, i. e. a "rippling" of the skin surface, thus facilitating the cutting thereof.

To this end, in accordance with the present invention, the edges of said channel-like frame members are undulatory in such a manner that a wave trough on the frame edge on one side of the cutting blade edge always lies opposite a wave crest on the frame edge of the other side, and the mean height of the undulations of the frame edges is substantially level with the contour of the cutting blade edge. Thus, the cutting blade edge moves along a line intermediate the plane common to the wave troughs and a plane common to the wave crests.

Whilst in the previously known construction the working surface produced is substantially homogeneous, on the other hand, in the construction according to the present invention, the transverse angle always varies over the length of the blade from crest to trough and from trough to crest. This results in an undulation of the working surface, that is to say in a rippling of the skin surface. This has been found to be extremely advantageous in the handling of the butcher's knife.

According to a further feature of the knife of the present invention the blade is laterally supported between the sides of the frame member throughout the entire length of the blade in contradistinction to prior proposals where the blade is supported between the frame member sides or arm portions only at spaced individual points. Conveniently, the blade supports comprise strips or guide members inserted along the inner faces of the channel-like frame member and bearing closely against the sides of the blade. By virtue of this construction, the blade can be made substantially thinner than heretofore thus further increasing the efficiency of the knife. Preferably, the blade support strips carry the undulations previously referred to.

In order that the invention may be more readily understood, reference is made to the accompanying drawings, which illustrate diagrammatically and by way of example, one embodiment of butcher's knife in accordance therewith, and in which:

Fig. 1 is a side view of the knife;
Fig. 2 is a side view of the embodiment shown in Fig. 1, partly in section, with a portion of the frame member omitted for the sake of clarity;
Fig. 3 is a section on the line III—III of Fig. 1; and
Fig. 4 is a fragmentary cross-sectional view on an enlarged scale illustrating a detail of the embodiment shown in Figs. 1 and 2.

In the drawings, A is a reciprocating cutting blade, running to a point at the front, and B is a handle housing driving means (not shown) for reciprocating the blade, conveniently, by electro-magnetic means. Shaft Z interconnects blade A with driving means in handle B, and is slidably supported in handle B. $f$ is a carrier mounted on the handle and supports a channel-like frame member $h_1$, $h_2$. Handle B, carrier $f$, and frame $h_1$ and $h_2$ together constitute a support means for supporting the guide members $m_1$ and $m_2$. In the embodiment shown in the drawing carrier $f$ is adapted to abut against the back edge of a blade A. The frame has a base portion and two arm portions each of which has a free edge and the guide members $m_1$ and $m_2$ are mounted, respectively, on the interior sides thereof. $i$ and $k$ are adjusting screws respectively for adjusting the height of the blade A in relation to the frame members $h_1$, $h_2$. Screw $i$ extends through a smooth bore in frame member $h_1$, $h_2$ and threadedly engages the carrier member $f$, thereby serving both to attach frame member $h_1$, $h_2$ to carrier member $f$ and to adjust the position of the carrier $f$ with respect to the frame member $h_1$, $h_2$. Inasmuch as the back edge of the blade A abuts the underside of the carrier $f$, the relative position of the carrier $f$ with the frame member $h_1$, $h_2$ determines the position of the blade A with the frame member $h_1$, $h_2$. Screws $k$, located on opposite sides of screw $i$ and threadedly extending through frame member $h_1$, $h_2$ to abut against the top face of carrier $f$, serve to stabilize the desired position. The blade A is supported and guided throughout its length between the frame member sides by strips or guide members $m_1$, $m_2$ secured to the inner faces of the frame sides. These strips bear closely against the sides of the blade A which due to the support provided by the strips can be made substantially thinner than heretofore. The undulations in the strips or free edge elements $m_1$ and $m_2$ are, as shown in Fig. 1, all of the same width and depth. These strips support blade A at its front point as shown in Fig. 2 where $V_1$ shows the forward-most position of the reciprocating blade, $V_2$ shows the full distance through which the blade point is reciprocable, and $V_3$ shows that, even when the blade point is in its rearward-most position, there is a portion of strips $m_1$ and $m_2$ still supporting the blade at its point. Fig. 2 shows also that the blade point, travelling through distance $V_2$, does not extend beyond the crest of the wave shown near $V_1$.

The lower edges of the inserted strips $m_1$, $m_2$ are provided with alternating undulations $x$ and $y$ such that a wave crest in strip $m_1$ is opposite a wave trough in strip $m_2$ and vice versa. The undulations $x$ and $y$ are of regular wave form the mean depth of which corresponds approximately to the knife blade edge. Thus it will be seen that the transverse angle $\alpha$ (Fig. 4) varies over the length of the blade from trough to crest and from crest to trough which leads to an undulation of the working surface i. e. a rippling of the skin surface to be cut, in the following manner.

If the knife were, for example, to be placed on the flat hand, without moving it, no cutting would occur; the blade A would be moved to-and-fro, but as the crests in the undulations extend beyond the blade edge, the latter does not reach the skin and consequently cannot cut it. Only when the knife is uniformly moved in one direction or the other, that is to say is not moved to-and-fro in short jerks, but drawn over the surface to be cut, is the skin drawn up into the depressions, in consequence of the construction of the strips $m_1$ and $m_2$, that is to say through the succession of wave crests and troughs, and there in the trough the cutting edge reaches the skin, in order to cut it. In other words, a "rippling" of the skin surface is caused by pulling the knife, and after the strips $m_1$ and $m_2$ have caused this rippling or corrugation of the skin, the skin is then cut through in the trough, of the strips $m_1$ and $m_2$. This thus ensures that only the skin drawn into the depresisons is cut through by the blade A. In consequence unintentional injury, or unintentional cutting of other parts of the skin, is impossible; in other words the skinning knife, which is now drawn along between flesh and skin and, for example, divides the conjunctive, now accurately cuts through the desired parts, without a diversion of this cutting pressure being possible in any way through the weight of the skin or through the movement of the knife, since the skin to be cut is in practice held so fast in the wave troughs and the opposite wave crests of the strips $m_1$ and $m_2$, tht the cut takes place perfectly and uniformly and without tearing.

We claim:

1. In a cutting apparatus, in combination, a supporting means; two elongated guide members mounted on said support means, said guide members being parallel to and spaced from each other and having free edges adapted to engage a work piece, said free edges being of undulatory wave form, the trough portions of the free edge of one of said guide members being opposite the crest portions of the free edge of the other of said guide members; and an elongated cutting member mounted on said supporting means located between said guide members and extending in the general direction of said guide members for reciprocating movement in the direction of the length of said cutting member.

2. In a cutting apparatus, in combination, a support means; two elongated guide members mounted on said support means, said guide members being parallel to and spaced from each other and having free edges adapted to engage a work piece, said free edges being of undulatory wave form, the trough portions of the free edge of one of said guide members being opposite the crest portions of the free edge of the other of said guide members; and an elongated cutting member mounted on said support means located between said guide members and extending in the general direction of said guide members for reciprocating movement in the direction of the length of said cutting member, said cutting member having a substantially straight elongated cutting edge adapted to engage the work piece and movable along a line intermediate the plane common to the trough portions of said guide members and a plane common to the crest portions of said guide members.

3. In a cutting apparatus, in combination, a support means; two elongated guide members mounted on said support means, said guide members being parallel to and spaced from each other and having free edges adapted to engage a work piece, said free edges being of undulatory wave form, the trough portions of the free edge of one of said guide members being opposite the crest portions of the free edge of the other of said guide members; an elongated cutting member mounted on said support means located between said guide members and extending in the general direction of said guide members for reciprocating movement in the direction of the length of said cutting member, said cutting member having an elongated back edge and a substantially straight elongated cutting edge adapted to engage the work piece and movable along a line substantially level with the mean height of said undulatory wave form of said edges of said guide members.

4. In a cutting apparatus, in combination, a support means; two elongated guide members mounted on said support means, said guide members being parallel to and spaced from each other and having free edges adapted to engage a work piece, said free edges being of undulatory wave from, the trough portions of the free edge of one of said guide members being opposite the crest portions of the free edge of the other of said guide members; and an elongated cutting member mounted on said support means located between said guide members and extending in the general direction of said guide members for reciprocating movement in the direction of the length of said cutting member, said guide members bearing closely against the sides of said cutting member.

5. In a cutting apparatus, in combination, a support means; two elongated guide members mounted on said support means, said guide members being parallel to and spaced from each other and having free edges adapted to engage a work piece, said free edges having forwardly located upwardly curving end portions and being of regular undulatory wave form, the trough portions of the free edge of one of said guide members being opposite the crest portions of the free edge of the other of said guide members; and an elongated cutting member mounted on said support means located between said guide members and extending in the general direction of said guide members for reciprocating movement in the direction of the length of said cutting member, said cutting member having a cutting edge with an upwardly curving portion at the forward end thereof and said guide members bearing closely against the sides of said cutting member.

6. In a cutting apparatus, in combination, an elongated channel-shaped frame member having a base portion and two arm portions, each of said arm portions having a free edge; two elongated guide members mounted on said arm portions, respectively, at the interior side thereof and adjacent said edges thereof, said guide members being parallel to and spaced from each other and having free edges adapted to engage a work piece, the free edges of said guide members being of undulatory wave form and projecting beyond the free edges of said arm portions, the trough portions of the free edge of one of said guide members being opposite the crest portions of the free edge of the other of said guide members; and an elongated cutting member located between said arm portions thereof and between said guide members and extending in the general direction of said frame member and said guide members for reciprocating movement in the direction of the length of said cutting member.

7. A cutting apparatus, comprising, in combination, an elongated channel-shaped frame member having a base portion and two arm portions, each of said arm portions having a free edge; two elongated guide members mounted on said arm portions, respectively, at the interior side thereof and adjacent said edges thereof, said guide members being parallel to and spaced from each other and having free edges adapted to engage a work piece, the free edges of said guide members being of undulatory wave form and projecting beyond the free edges of said arm portions, the trough portions of the free edge of one of said guide members being opposite the crest portions of the free edge of the other of said guide members; an elongated cutting member located between said arm portions thereof and between said guide members and extending in the general direction of said frame member and said guide members for reciprocating movement in the direction of the length of said cutting member; and driving means operatively associated with said cutting member for moving the same in the direction of its length.

8. A cutting apparatus, comprising, in combination, an elongated channel-shaped frame member having a base portion and two arm portions, each of said arm portions having a free edge; two elongated guide members mounted on said arm portions, respectively, at the interior side thereof and adjacent said edges thereof, said guide members being parallel to and spaced from each other and having free edges adapted to engage a work piece, the free edges of said guide members being of undulatory wave form and projecting beyond the free edges of said arm portions, the trough portions of the free edge of one of said guide members being opposite the crest portions of the free edge of the other of said guide members; an elongated cutting member located between said arm portions thereof and between said guide members and extending in the general direction of said frame member and said guide members for reciprocating movement in the direction of the length of said cutting member; an elongated handle member secured to said frame member in end-to-end relationship therewith; and driving means secured to said handle member and operatively associated with said cutting member for moving the same in the direction of its length.

References Cited in the file of this patent

UNITED STATES PATENTS

| | | |
|---|---|---|
| 2,168,703 | Dziedzic et al. | Aug. 8, 1939 |
| 2,584,487 | Mischke | Feb. 5, 1952 |
| 2,596,078 | Prohaska | May 6, 1952 |
| 2,629,928 | Moravcik | Mar. 3, 1953 |